April 21, 1964 F. D. LASSWELL, JR 3,129,551
HARD FRUIT PICKER
Filed June 15, 1960 3 Sheets-Sheet 1

Fred D. Lasswell, Jr.
INVENTOR.

BY R. T. Sperry

United States Patent Office 3,129,551
Patented Apr. 21, 1964

3,129,551
HARD FRUIT PICKER
Fred D. Lasswell, Jr., 329 Bayshore Blvd., Tampa, Fla.
Filed June 15, 1960, Ser. No. 36,448
9 Claims. (Cl. 56—328)

This invention relates to a new and improved hard fruit picker and is a continuation-in-part of my application for patent entitled Spindle, Spindle Arrangement and Method of Operation, Serial No. 768,352, filed October 20, 1958, and now abandoned.

In a prior, presently pending application for patent of mine, Serial No. 747,275, now Patent No. 3,040,507 filed July 8, 1958 and entitled Harvesters, the general principle of inserting a plurality of spaced-apart rotating spindles into the periphery of a tree bearing hard fruit to permit paddle members thereon to engage the fruit and cause its removal from the tree was disclosed. The present invention is concerned among other things with a particular spindle arrangement for the more effective removal of fruit from a tree.

A principal object of this invention is therefore to provide a fruit picker having a picking head in which there is included a plurality of fruit engaging rotating spindles.

Another important object of this invention is the provision of a harvester for the fruit of trees having a bank of harvesting spindles in which certain of the spindles have one fin and others of the spindles have two fins, the fins cooperating with fins on adjacent spindles to engage the fruit and spin it loose from the tree.

Another important object of this invention is to permit easy penetration of a bank of fruit harvesting spindles into and through the outer area of a hard fruit tree for movement into the interior thereof for harvesting fruit.

A still further important object of this invention is to provide a bank of fruit picking spindles arranged and constructed for ease of penetration into a fruit bearing tree.

Another and further important object of this invention is to supply a plurality of parallel disposed fruit picking spindles in which the spindles have fruit engaging fins in strategic positions thereon and arranged in such a pattern that upon rotating all of the fruit picking spindles in the same direction at the same speed, fruit picking pockets will be formed between three adjacent spindles and the majority of these fruit picking pockets will be free of picking fins, another substantial number of the pockets will have only one picking fin obstructing passage thereinto and only a small minority of the pockets will have three fins penetrating the pockets from the three adjacent spindles for spinning the fruit, which may be in the pockets, loose from the tree.

Another important object of this invention is to equip fruit picking rotating spindles with tapered or conical shaped points at their forward ends, the points having spiral grooves therein with a proper lead considering the direction of rotation of the spindles to enhance outer tree area penetration of the fruit picking spindles and to separate and lead fruit clusters into the fruit picking head.

A still further important object of this invention is to provide a fruit picking mechanism including a portable supporting structure, a bank of spindles in parallel disposition carried on said supporting structure, mechanism associated with the supporting structure for moving the bank of spindles into the outer area of a fruit bearing tree, fruit engaging fins on the spindles arranged and constructed to spin the fruit free of its attachment to the tree branches, and means for tumbling the separated fruit downwardly for deposit into a receiving container or receptacle.

Another and still further important object of this invention is the provision in a fruit harvester of a bank of fruit engaging rotating spindles in which the bank of spindles is arranged with alternate horizontal rows of spindles offset from the spindles in the row immediately adjacent thereto whereby when fruit is separated from the tree and falls downwardly it tumbles down in a cascading fashion and is retarded in this downward fall by reason of the offset spindles.

The various inventive concepts here presented may have a wide field of utility in construction, operation and/or arrangement of rotary spindles operable in the manipulation of articles and materials of numerous types. However, the invention is more particularly concerned with a spindle, spindle arrangements and spindle drive for the spindles of a harvester of the general type disclosed in my prior copending application, Serial Number 747,275, now Patent No. 3,040,507 filed July 8, 1958 and entitled Harvesters.

Another and still further important object of this invention is the provision of a fruit engaging fin for harvesting spindles in which the fin extends radially outwardly from the spindle as in the form of a paddle and at least the forward end thereof is arcuately notched from the radial limit downwardly and forwardly to a juncture with the spindle for the purpose of permitting a generally round fruit to easily enter the area of the paddles.

I is a general object of the present invention to provide a novel picking arrangement of harvesting spindles and to provide a method of drive for such arrangement.

Numerous other objects, features and advantages of the present invention will become apparent from the disclosures in the following specification and the accompanying drawings.

General Statement of the Invention

Figure 1:
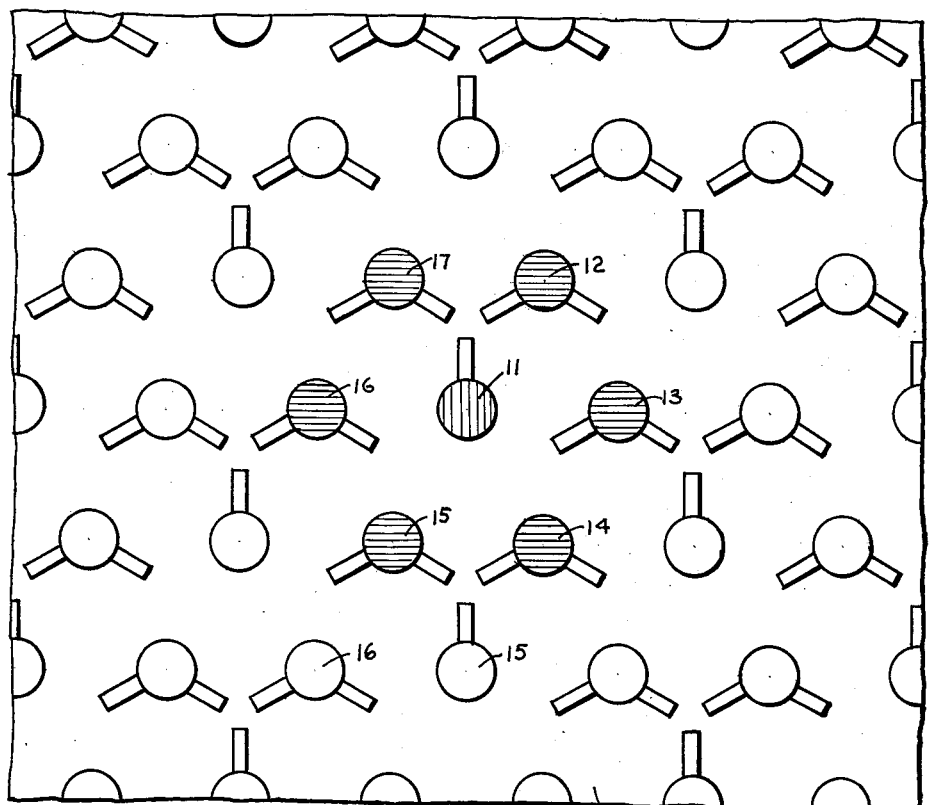
FIGURE 1 is a diagrammatic view illustrating a fragment of a harvester head with finned spindles arranged and oriented in accordance with the teachings of the present invention.

The invention may be broadly defined as including a picking spindle of either one of two fins. In the case of a picker with two radial fins they are preferably arranged in an unbalanced relation. As shown in this application the two fins are spaced at 120 degrees apart. The arrangement of the spindles is that of parallel staggered rows with each single fin picker spindle being surrounded by a circle of six equally spaced and equidistant double fin picker spindles. Thus in a representative bank of 80 spindles there may be 28 single fin spindles and 52 double spindles with a total of 132 fins as distinct from the 240 fins of an 80 spindle bank of the triple fin type presented in my previous application. This arrangement of spindles provides for 126 triangular spaces, six radiating outwardly from each of the internal single fin picker spindles. Each such radiating triangle with a single fin picker spindle as the common apex defines a receptacle for the reception of fruit. In this system all the spindles are rotated in one direction at a uniform speed and the fins are so timed that in each triangle at some point during spindle rotation three fins will be pointed at a common point forming what is referred to herein as a closed position. In such a closed position the fins are in maximum engagement with the fruit to rotate or spin the fruit on an axis normal to the axis of its calyx to disengage it from its stem.

The closing of the triangles with respect to any one single fin picker spindle will move in succession to each adjacent triangle about such single fin picker spindle so that the picking action is orbital with respect to any cluster of triangles centered about a single fin picker spindle. Since all of the single fin spindles are in the same timed relationship the various closed pockets maintain constant special relationship with respect to one another as they orbit through the six triangles about the single fin spindles. This arrangement also gives a spacial relationship of open pockets to permit easy entry of the fruit picking spindle panel into a fruit bearing tree. The orientation of the spindles in connection with the fact that the fins of the double fin picker are spaced only 120° apart insures ample free vertical passages for stems and branches of the trees, thus facilitating the movement of the head into the body of the tree and materially reducing the force required to thrust the spindles into the fruit bearing portions of the tree.

As shown in the drawings:

FIGURE 1 represents a fragmentary portion of a harvester head or panel of the present invention through the flat base or support 10 of which parallel spindles extend on axes generally normal to the plane of the base 10. It will, of course, be understood that the number of spindles used is immaterial. The fragment here shown may be considered as a central section of an 80 spindle head consisting of 8 horizontal rows of 10 spindles each, there being a vertically staggered arrangement of such rows. In the arrangement here shown each horizontal row of spindles includes two successive double paddle picker spindles, spaced by one single paddle picker spindle. The single wing picker spindles of the intermediate rows are located in vertical alignment between the double wing picker spindles of the adjacent horizontal rows there above and below. For purposes of illustration with respect to the relative orientation and method of operation of the spindles, a central single wing picker spindle is illustrated in FIGURE 1 at 11 and designated by the vertical hatching. Its surrounding series of six two-wing picker spindles are designated by the numerals 12, 13, 14, 15, 16 and 17, and distinguished by horizontal hatching. The spindles form triangular object or crop receiving areas. When the single wing of spindle 11 is in an upwardly projecting position as shown in FIGURE 1 one wing from each of spindles 17 and 12 is also projecting into that triangular area defined by the spindles 11, 17 and 12. As the spindles rotate one-sixth of a revolution the triangular area having three wings or fins therein will be the one into which the single wing of the spindle 11 is projecting. For example, the next triangular area to have three wings therein after all of the spindles are rotated 60° will be the triangle defined by the spindles 11, 12 and 13. And, similarly upon each one-sixth revolution of the spindles the successive triangular areas having three wings therein will be defined by the spindles 11, 13 and 14; 11, 14 and 15; 11, 15 and 16; and 11, 16 and 17. In each instance, when the single wing is in any one triangular area, one wing of each double picker spindle located at the outer apices of such triangle will be in that triangle to effect a maximum closing thereof. This action is one in which the single wing is successively presented to succeeding triangles in a circular series of triangles located around the spindle of the single wing. As above stated when the single wing or fin is located in a triangle, that is the time when the double wing spindles at the outer apices of such successive triangles also have one of their wings or fins in the same triangle. The action of effecting the maximum closing condition occurs serially in a circular pattern of triangles about each single wing picker spindle. The closed triangles are always the ones in which the single wing is located during its rotation.

It is to be noted that in a bank of spindles every double wing picker spindle cooperates in closing pockets with the three single wing picker spindles spaced at 120° around it.

Figure 2:
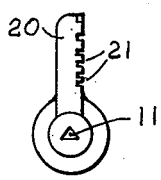
FIGURE 2 is a rear elevational view of a single fin spindle.
Figure 3:
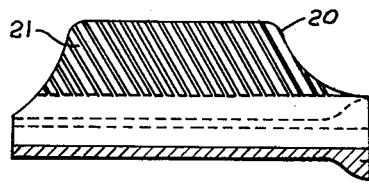
FIGURE 3 is a side elevational view of the fin depicted in FIGURE 2.
Figure 4:
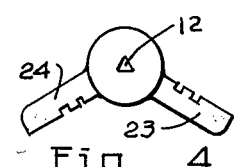
FIGURE 4 is a front elevational view of a double fin spindle.

As a specific illustration of the picking fins of the spindles, reference may be had to FIGURES 2, 3, and 4. In FIGURE 2, the spindle 11 has a single fin 20 with inclined serrations 21 formed on the leading face thereof. The serrations act to increase gripping and lend an increased yieldability to the wing to provide a soft contacting fin so as not to damage, injure or bruise the surface of fruit being picked. The inclination of the serrations may act to assist in urging the fruit rearwardly of the direction of movement of the spindle as it penetrates the tree as well as insuring adequate grip and traction of the wing with respect to the fruit. The picker fin 20 as shown in FIGURE 3 is also provided with a tapered or conical head 22 at the penetrating end thereof so that fruit having passed such head will lodge therebehind to preclude its movement forwardly out of the spindle bank. The arcuate or rounded cutout or notch 20a at the forward end of the paddle-like fin 20 cooperates with the conical head 22 in forming almost a full receiving pocket for round fruit in which the fruit is lodged until the pocket is opened and further inward movement of the spindle into a tree causes engagement of the fruit by the fin preparatory to removal of the fruit from its tree stem. The rounded notch or taper 20a permits easy entry of the picking spindles into a tree to be harvested of its fruit. The notch also prevents a forward kicking of the fruit by which it might be lost. The spindle 12 of FIGURE 4 has two wings which are positioned at 120° angular relationship and are designated by the numerals 23 and 24.

Figure 5:
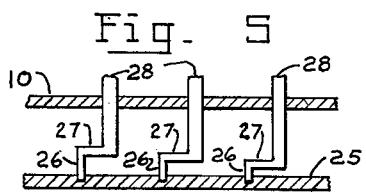
FIGURE 5 is a fragmentary sectional view illustrating one form of spindle drive means.

The spindles may be driven by a wobble or oscillating plate 25, as shown in FIGURE 5, into which are set the ends 26 of cranks 27 fixed to the ends of the spindles, therein indicated by the numeral 28. The spindles being journalled for rotation within the relatively fixed base or stationary plate 10 are thus rotated by a circular movement of the plate 25. The plate movement thus imparts a synchronous rotational movement of the spindles at uniform speed in the same direction.

Figure 6:
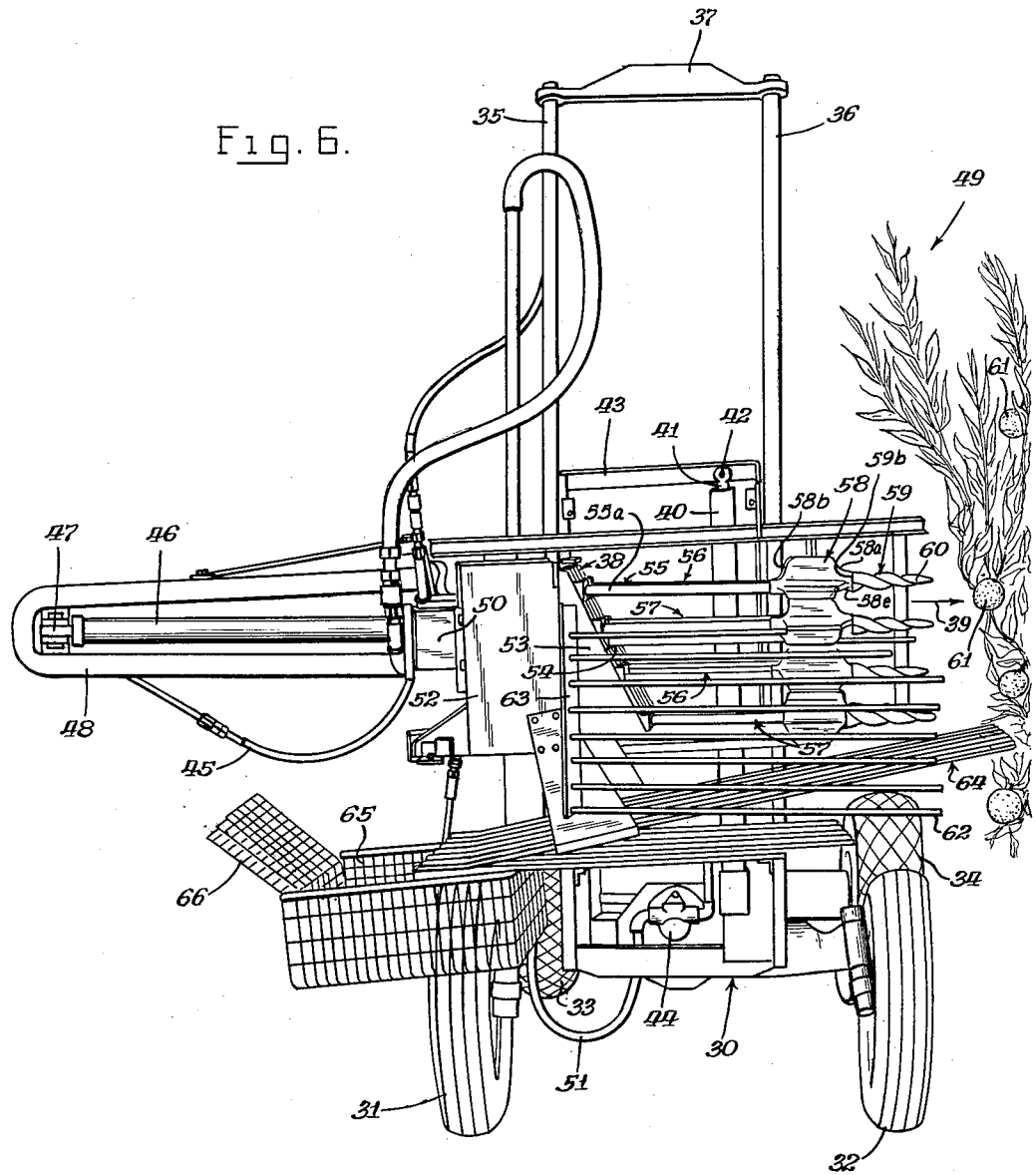
FIGURE 6 is an end elevational view showing the hard fruit picker of this invention.

As best shown in FIGURE 6 a mobile frame supporting structure 30 is carried on steerable wheels 31 and 32 at one end thereof and traction wheels 33 and 34 at the other end. The mobile frame 30 on which the harvesting unit mounted is employed to move the harvesting unit relative to a fruit bearing tree from which vantage point the harvesting unit may be inserted into the surface of the tree and as will be subsequently described outer area will be picked from the tree and caught by the harvesting unit for eventual deposit into a receiving receptacle. Parallel standards 35 and 36 are affixed to the frame structure 30 and are joined at their tops with a cross member 37 to assist in maintaining parallelism. These vertical parallel standards 35 and 36 provide track means for moving the picking head identified generally as 38 in or through a vertical movement. The head or bank of spindles 38 is also movable in a horizontal path in order to have the plurality of spindles as shown in both of FIGURES 1 and 9 enter the surface of fruit bearing tree to effect a picking of the fruit therefrom. The arrow 39 in FIGURE 6 clearly indicates a "treeward" direction of movement of the harvesting spindle bank 38. It is preferable that the vertical and horizontal movements of the spindle panel be occasioned by hydraulic means. For effecting vertical movement of the spindle head there is provided a cylinder 40 and an included piston 41 fastened at 42 to a cross bar 43 which is mounted for sliding movement on the vertical standards 35 and 36. A horizontally disposed cylinder 46 having a piston 47 is mounted within a bail-like frame member 48 on the backside of the fruit picker. Extension of the piston 47 from the cylinder 46 causes the spindle bank 38 to be moved horizontally and into the tree identified as 49. In order to effect operation of the cylinder and pitson 40—41 and the cylinder and piston 46—47 fluid under pressure is delivered thereto through various conduits 45. The rotation of the spindles in the head 38 is also accomplished hydraulically. A hydraulic pump 44 is driven by means (not shown) and delivers fluid under pressure through the conduit 51 to a hydraulic motor 50 which in turn supplies rotative drive for the harvesting spindles. As previously stated it should be understood that the bank of spindles as shown in FIGURE 6 is only representative of a harvesting machine for fruit and there is and has been no attempt to shown any specific number of rotating spindles in the fruit harvesting head 38.

Figure 7:
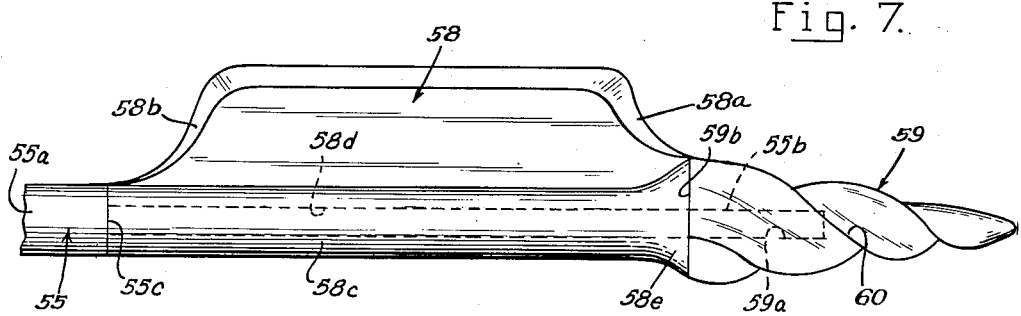
FIGURE 7 is an enlarged side elevational view of one of the single fin picker spindles and radial picking fins as shown in the fruit picker of FIGURE 6.
Figure 8:
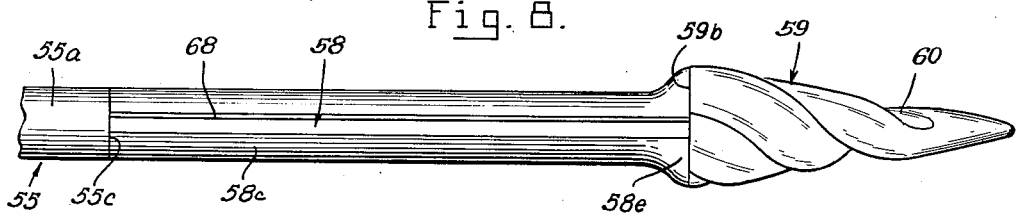
FIGURE 8 is a view similar to FIGURE 7 with the spindle rotated substantially 90 degrees.
Figure 9:
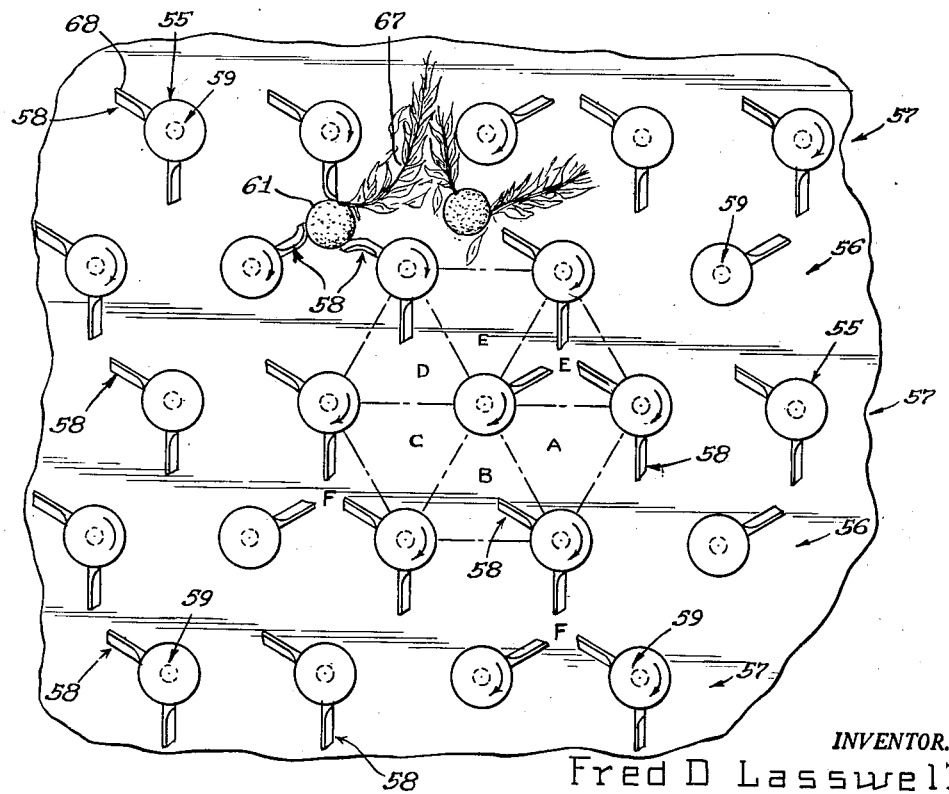
FIGURE 9 is an enlarged front elevational view of the fruit picking spindles of this invention similar to the arrangement of spindles in FIGURE 1 of the drawing, but including a cluster of fruit in the picking head and indicating diagrammatically how the fruit is spun free of the tree.

As shown in FIGURE 6 the head 38 includes a generally rectangular support or block member 52 with an auxiliary forward portion 53 having a downward and laterally inclined forward edge 54. Rotating spindles 55 are arranged in horizontal rows 56 and 57 as shown in FIGURES 1 and 9 with the alternate rows 57 having their spindles staggered with respect to the spindles in the rows 56, immediately above and below. The outer ends of the spindles 55 are unsupported. The inner ends of the spindles are journally supported within the block 52 and its inclined extension 53. As shown in FIGURES 6, 7 and 8 the spindles 55 are provided with radially disposed flexible paddle or fin members 58 which will subsequently be described in detail. The outer unsupported ends of these spindles 55 are provided with nose cones 59 which as shown in FIGURES 6, 7 and 8 are equipped with a spiral groove 60 to aid in tree penetration. Thus when a bank of rotating spindles is pushed against the outer surface of a fruit bearing tree the lead of the screw and the direction of rotation of the spindle cooperate to screw their way into the tree so that the fins or paddles 58 may remove the fruit designated by the numeral 61 from the tree.

The spindles 55 are preferably made of a good quality of steel so that they have sufficient resiliency when entering into or being withdrawn from a fruit bearing tree to avoid breaking or bending. The inner ends 55a of the spindles 55 which are journally supported in the block member 52 have a relatively large diameter while the outer unsupported ends 55b of the spindles have a smaller diameter. An annular shoulder 55c is formed on the spindles at the juncture of the inner and outer ends of the spindles. The fins and nose cones are preferably formed of rubber, synthetic rubber or plastic having a flexibility necessary to avoid damaging the fruit or other crop as it is removed, yet having enough frictional resistance when engaging the fruit to impart rotation thereto for removal in a manner to be subsequently described. The fin has a hub 58c which has a longitudinal socket 58d extending the length thereof and continuing into the nose cone 59 as shown at 59a. The forward end of the hub 58c flares outwardly in the form of a cone as shown at 58e. The rear edge 59b of the nose cone 59 is substantially the same diameter as the forward end 58e of the hub so that there is presented a smooth uninterrupted surface for guiding the crop to be harvested into the area of the fins 58. The small diameter outer ends 55b of the spindles are inserted into the aligned sockets 58d—59a of the fin structure and nose cone. It should be understood that the nose cone and fin structure, although shown as two pieces, may be made as a single piece. In the single wing spindles there is only a single fin radiating outwardly from the hub 58c while with the double wing spindles there are two fins radiating outwardly from the hub 58c at 120° apart. The long snug engagement of the rubber fin structure with the steel spindles tends to prevent relative rotation of the fins with the spindles. However, if it is desired means may be employed to pin or otherwise key the rubber fin hub to the steel spindle. The hub 58c is arranged to abut the shoulder 55c on the spindle.

The plurality of spindles 55 are flanked on both sides by a vertical wall of spaced-apart stationary rods 62. These rods 62 are supported at their rearward ends on vertical angle members 63 and provide the means for retaining loose fruit within the picking head and its spindles so that the fruit cannot move outwardly laterally of the picking head but rather must fall downwardly to a plurality of downwardly and rearwardly inclined laterally spaced-apart rods 64. These rods 64 form a bed on which the hard fruit rolls downwardly and rearwardly for discharge into a basket-like receptacle 65. The basket receptacle is provided with a bank board 66 which acts as a splash wall and guide for the fruit that is being deposited in the basket.

It is preferable that the nose cones 59, mounted on the spindles 55 outwardly of the fins 58, which act to screw the spindles 55 into a fruit bearing tree, be relatively slick so that there will be no frictional resistance to tree penetration. When the spindles are inserted into a tree the hard fruit which may be disposed in any one of the triangular pockets formed between three adjacent spindles will eventually be removed by a rotation of the spindles at a time when the pocket is filled with three fruit engaging fins or paddles 58. It is quite evident in FIGURE 9 how the fruit is removed from its branch or stem 67. The fruit 61 is gripped at three generally equally spaced-apart positions by the fins 58 and as the work spindles 55 rotate, there is imparted a similar rotation to the hard fruit 61 causing it to be spun loose from the stem 67. It is this rotating motion rather than a pulling motion which makes for proper fruit havesting. In the case of a citrus fruit such as oranges or grapefruit it is desirable that the calyx which constitutes the means of attachment of the orange to its stem not itself be removed or if removed that it be snapped clean so that none of the orange skin is removed with it. When a portion of the orange skin has been torn loose by a pulling out with the calyx the fruit is stated to be "plugged." Plugged fruit is not considered first quality and is generally used to make juice or juice concentrates rather than shipped as fresh fruit. A plugged fruit will spoil rather rapidly and does not stand shipment as fresh fruit. In the fins 58 shown in FIGURES 6, 7, 8 and 9 there are no inclined serrations such as shown at 21 in FIGURES 2 and 3 but rather the fins 58 are of relatively thin cross section such as shown at 68 in FIGURE 9 permitting the fin 58 to flex and act as a spinner for the fruit 61 being removed from its stem 67. An arcuate or tapered notch 58a in the fins 58 is similar to the notch 20a in the fins 20 and provides a receiving pocket for a piece of generally round fruit prior to entry of that fruit into the fruit removing pockets. The rear of the fins 58 are also arcuately notched as at 58b and the purpose of the notching is for easy removal and then reentry of fruit into the fruit removing pockets. Thus when a spindle panel is inserted into a fruit tree beyond the fruit cluster without removing the fruit, the fruit will easily reenter the pockets on withdrawal of the panel. Of course this gives the picker a second chance to harvest the fruit. A similar notch 20b is provided on the fins 20 for the same purpose.

In the operation of the device to pick generally round objects such as citrus or other hard fruit, the spindle carrying head or panel is moved into the fruit bearing area of a tree. This means that the spindles penetrate the periphery of the tree and encompass the fruit and branches of the tree to a depth substantially co-extensive with the amount of spindle penetration. The fruit which quite often is in clusters is guided by the nose cones into the spaces between the spindles and into the areas designated as triangles or fruit picking pockets by the dashed lines of the drawings. The time that each triangle is empty of wings or working paddles totals one-half of any operating period. Thus for one full revolution of the spindles each pocket will be void of fins for one-half of the period required to rotate the spindles for that revolution. The triangles are thus fully free to receive fruit during one-half of the operating time. Also the time that each triangle contains only one wing totals one-third of the same operating period. Fruit may also enter during such intervals. As previously stated the arcuate or tapered notch at the forward ends of the paddles or fins facilitates entry of the fruit into the pockets and tends to prevent forward kicking of the fruit. Also the arcuate or tapered notches at the rear of the paddles performs the same function on withdrawal of the panel after the spindle fins have proceeded past the fruit. Both front and rear arcuate notches minimize winding of small branches on the harvesting fins. As the wings from three spindles enter a common triangle they engage the fruit therebetween and by frictional contact therewith, rotate the fruit on an axis substantially at right angles to the axis through the calyx, to twist the fruit from the stem. I will also be noted that since the wings are at each position only once per revolution as illusted in FIGURE 1, movement from such position will open long vertical and shorter horizontal and angular channels free of any wings so that the stems and branches of the tree may freely move into the head and shift along the above mentioned channels. By this arrangement it will therefore be seen that the head may be readily inserted into branches of a tree with a minimum of resistance to such entrance. This spindle and fin arrangement permits maximum freedom of spindle movement through the branches while at the same time providing an adequate fruit picking capacity.

The bank of spindles shown in FIGURE 9 is of course the same as for the bank of spindles shown in FIGURE 1. However, in FIGURE 9 there has been shown several pieces of fruit and stems to show the relationship of fruit to spindle picker and also to indicate the large openings between most of the spindles most of the time thus permitting easy penetration of the fruit removing head into a fruit bearing tree. In the same manner as the fixed pockets have been shown in FIGURE 1 there is also shown in FIGURE 9 a group of pockets identified by the letters A, B, C, D, E and F. In the pocket A there are no fruit removing fins. There is only one fin 58 in the pocket B at this precise moment in the rotation of the spindles which as previously stated all move simultaneously in the same direction of rotation. Pockets C and E are identical to pocket A and have no fruit removing fins therein. Pocket D is similar to pocket B and has only one fruit removing fin therein. Thus of these six triangular pockets, three pockets have no fins, two pockets have one fin and one, namely F, has three fruit removing fins therein to engage an orange or other hard fruit such as shown in another portion of FIGURE 9.

The subject invention presents a new and improved spindle and fin arrangement in a harvester head of the type disclosed in my prior application. While the spindle rotation is here shown to be in clockwise direction, a reversal of spindle rotation will effect a similar fruit picking action in a counterclockwise direction. When the spindles rotate in an opposite direction to that shown it is obvious that the fin serrations 21, when used, should be on the opposite fin faces. It will, of course, be understood that while the invention as here presented is an arrangement and method of operation for harvester spindles of the type disclosed in my prior application, other uses are obvious and numerous changes, modifications and the full use of equivalents may be resorted to without departure from the spirit or scope of the present invention.

What is claimed is:

1. A spindle arrangement for harvesting elements including a support positionable in proximity to a crop to be harvested, a first spindle journally mounted in said support, a single paddle on said first spindle a second parallel spindle journally mounted in said support adjacent said first spindle, and two paddles on said second parallel spindle.

2. A spindle arrangement for harvesting elements including a support positionable in proximity to a crop to be harvested, a first spindle carried for rotation on said support, a single work performing paddle mounted on said first spindle, a second parallel spindle carried for rotation on said support, two work performing paddles mounted on said second spindle, and the orientation of said spindles and paddles being such that upon rotation thereof the single paddle will be directed toward one of the paddles on the second spindle.

3. A bank of parallel harvesting spindles including a support positionable in proximity to a crop to be harvested, spindles carried for rotation in said support, certain of said spindles having one crop engaging paddle thereon and certain of said spindles having two arcuately spaced apart engaging paddles thereon, and the spindles having two paddles thereon arranged in an equally spaced circular series around each of said spindles having one paddle thereon.

4. A device as set forth in claim 3 in which there is included means to turn all of said spindles at uniform speed in the same direction and the paddles timed with each other in such a manner that the single paddle will successively cooperate with paddles of the two paddle spindles to form crop picking pockets which are successively closed with paddles from three adjacent spindles including the single paddle spindle.

5. A harvester head including a support positionable in proximity to a crop to be harvested, a plurality of parallel spindles carried on said support, crop engaging single fins mounted on certain of said spindles and crop engaging two fins mounted on next adjacent spindles in every direction.

6. A harvester head including a support positionable in proximity to a crop to be harvested, a plurality of spindles carried on said support, crop engaging, single fins mounted on certain of said spindles and crop engaging two fins mounted on next adjacent spindles, said two fin spindles surrounding said single fin spindles in an equi-distant circular series.

7. A harvester head including a support positionable in proximity to a crop to be harvested, a plurality of spindles carried on said support, single fins mounted on certain of said spindles, two fins mounted on next adjacent spindles, said two fin spindles surrounding said single fin spindles in an equi-distant circular series, and said two fin spindles having its fins angularly related at 120°.

8. A fruit harvester head including a support positionable in proximity to a fruit crop to be harvested, a plurality of spindles carried on said support, single fins mounted on certain of said spindles, two fins mounted on next adjacent spindles, said two fin spindles surrounding said single fin spindles in an equi-distant circular series, said two fin spindles having its fins angularly related at 120°, said single fin spindles being oriented with respect to said two fin spindles to provide for intermittent co-operation of the single fin with one of the two fins of each of two adjacent two fin spindles to close fruit harvesting pockets in succession around said single fin spindle upon rotation of the spindles at uniform speed in the same direction.

9. A citrus fruit harvester including a supporting plate, positionable in proximity to a fruit crop to be harvested, a plurality of single wing picker spindles rotatably mounted through said plate, a circular group of double wing picker spindles rotatably mounted through said plate around each single wing picker spindle and means for rotating all of said spindles synchronously.

References Cited in the file of this patent

UNITED STATES PATENTS

| | | |
|---|---|---|
| 220,607 | Ham | Oct. 14, 1879 |
| 241,406 | Nixon | May 10, 1881 |
| 464,852 | Canuteson | Dec. 8, 1891 |
| 1,077,640 | Randall | Nov. 4, 1913 |
| 2,586,834 | Kreisman | Feb. 26, 1952 |
| 2,692,470 | Boman | Oct. 26, 1954 |
| 2,698,508 | Hollister | Jan. 4, 1955 |
| 2,775,088 | Bullock | Dec. 25, 1956 |
| 2,825,197 | Smith | Mar. 4, 1958 |
| 3,040,507 | Lasswell | June 26, 1962 |